United States Patent
Mansfeld et al.

[15] 3,670,075
[45] June 13, 1972

[54] PROCESS OF PREPARING A PROTEASE INHIBITOR

[72] Inventors: Viktor Mansfeld; Zdenek Padr, both of Prague, Czechoslovakia

[73] Assignee: Spofa, United Pharmaceutical Works, Prague, Czechoslovakia

[22] Filed: May 13, 1970

[21] Appl. No.: 37,007

[30] Foreign Application Priority Data

May 19, 1969   Czechoslovakia ..................... 3534/69

[52] U.S. Cl. ............................................... 424/110, 424/94
[51] Int. Cl. ............................................................. A61k 17/00
[58] Field of Search ............................................. 424/94, 110

[56] References Cited

FOREIGN PATENTS OR APPLICATIONS 757,339   9/1956   Great Britain ......................... 424/110
908,333   10/1962  Great Britain ......................... 424/110

*Primary Examiner*—Albert T. Meyers
*Assistant Examiner*—Frederick E. Waddell
*Attorney*—Michael S. Striker

[57] ABSTRACT

Process for preparing a protease inhibitor from animal pancreas, for instance hog and cattle pancreas, following extraction of insulin therefrom with a dilute mineral acid, such as phosphoric acid, comprising the steps of:

1. extracting moist cut-up pancreas material with 60 to 70 percent aqueous ethanol having a pH of 10–13,
2. removing the ethanol from the extract by evaporation under decreased pressure and at a temperature not exceeding 40° C.,
3. cooling the remaining concentrated extract whereby lipoids present therein are separated out and removing the separated lipoids,
4. introducing a water-soluble inorganic salt and preferably ammonium or magnesium sulfate, whereby a precipitate comprising an protein complex is separated out and recovering the precipitate,
5. forming a suspension of the precipitate from step 4 in water having a pH of 5.5 to 7.5 and heating the suspension to a temperature of 50° to 80° C, introducing trichloracetic or sulfosalicylic acid into the suspension in a concentration of 2 to 3 weight percent, cooling the resulting mixture to a temperature of 15° to 20° C., whereby the protein is separated out as a precipitate and separating off said albumin precipitate,
6. adjusting the pH of the filtrate to a pH of 7.0 to 7.5, saturating the filtrate with sodium chloride in an amount of 25 to 30 g/100 ml filtrate and acidifying the saturated filtrate with hydrochloric acid to provide a pH of 1.0 to 3.0 whereby the inhibitor is separated out as a precipitate,
7. subjecting the precipitate from step 6 to successive washings with a buffered sodium chloride solution whose pH is successively increased from 1.7 to 9.0 and separately recovering the fractions from each washing, combining the fractions recovered in the pH range of 3.0 to 6.0, subjecting the combined fractions to deionization and recovering the pure inhibitor.

3 Claims, No Drawings

PROCESS OF PREPARING A PROTEASE INHIBITOR

This invention relates to a process for manufacturing a protease inhibitor from animal and in particular from cattle and/or hog pancreas following preliminary extraction of the insulin therefrom with a dilute mineral acid.

As is known, natural protease inhibitors are present in plant and animal organisms. From the therapeutic standpoint, only the inhibitors of animal origin are important. The inhibitor has been found and recovered with equal success from different animal organs such as pancreas, lung, parotid, liver, spleen and the like and also from body fluids such as blood, milk and urine. There are many types of protease inhibitors and they can be distinguished one from the other by their chemical properties, molecular size or stability and in particular by their specific activity against the proteolytic enzymes, i.e., trypsin, chymotrypsin, kallikerein, thrombin, plasmin, etc.

In the majority of cases, the preparation of known therapeutically useful protease inhibitor substances uses liver, pancreas or parotid as starting material. The crude material as a rule is extracted with methanol and the crude fraction which contains the inhibitor precipitated with acetone. The high molecular protein is removed by treatment with sulfosalicylic acid and the use of ion exchangers and the active compound then isolated through precipitation with acetone.

In accordance with the instant invention, an advantageous process for manufacturing a protease inhibitor from cattle and/or hog pancreas is provided comprising acidifying the minced pancreatic material with a mineral acid, in particular phosphoric acid to a pH of 2.0 to 3.5 and extracting the acidified material with 70 percent ethanol. Under these conditions, the inhibitor is not simultaneously extracted with the insulin but remains in the minced pancreas material. This latter material when treated in the manner now set out permits recovery of the inhibitor in maximal yields and in high purity and activity.

In accordance with the invention, the starting material, i.e., moistened cut-up pancreas, is extracted with 60 to 70 percent aqueous ethanol having a pH of 10.0–13.0, the ethanol then driven off from the extract by evaporation under lowered pressure and at a temperature of at the highest 40° C., the lipoids present are then separated from the concentrated extract by chilling, from the thusly purified aqueous extract an protein complex in the form of a precipitate is separated by introducing into the extract a soluble inorganic salt, preferably ammonium or magnesium sulfate, thereafter the protein complex precipitate is isolated and converted into an aqueous suspension having a pH of 5.5–7.5, from which at a temperature of 50°–80° C. by treatment with trichloroacetic acid or sulfosalicylic acid in a concentration of 2–3 weight percent and through a subsequent cooling down to a temperature of 15°–20 C., the ballast albumin in the form of a precipitate is separated off (this fraction is not further worked up), adjusting the filtrate which contains the freed inhibitor to a pH of 7.0 to 7.5, saturating the filtrate with sodium chloride in an amount of 25 to 30 g/100 ml and acidifying the saturated filtrate with hydrochloric acid to a pH of 1.0 to 3.0 whereby the total of the free inhibitor is separated out in the form of a precipitate from which an enriched inhibitor is isolated by successively washing with a buffered sodium chloride solution whose pH value is continuously increased upwardly from 1.7 to 9.0, combining the fractions recovered in the pH range of 3.0 to 6.0 and after deionization working up this combined fraction to the pure inhibitor in the known manner through freeze drying or precipitation.

For adjusting the pH value of the aqueous ethanol to 10.0 to 13.0 for use in the extraction of minced pancreatic starting material, there is used an alkali metal hydroxide or ammonium hydroxide.

As buffered sodium chloride solution, there can be used a 22 to 25 percent sodium chloride solution in 0.01 M phosphoric acid whose pH value can be continuously increased upwardly through addition of sodium hydroxide.

The process for the manufacture of a protease inhibitor in accordance with the invention is under the consideration of the properties of the raw material so regulated as to form a single intermediate product with the goal of obtaining the highest yield and the most pure end product. It has been experimentally proven that it is most advantageous in the first step to hold the concentration of the extraction agent in the given range. At a lower concentration of the ethanol than 60 percent, too much of the ballast material passes over into the extract which makes the further working up difficult. At higher concentrations than 70 percent, the protease inhibitor is in general not extracted. On concentration of the extract, i.e., removal of the ethanol, there is recovered an aqueous solution from which the lipoid substances are best separated by cooling. From the thusly purified aqueous solution, there is isolated by salting out an protein complex in the form of a precipitate which precipitate contains the inhibitor in a bound form. The freeing of the inhibitor takes place in the following step wherein the protein complex at a pH of 6.0 to 7.0 by treatment with trichloracetic or sulfosalicylic acid at moderately high temperatures is split. This step is most important of the entire process, and only by maintenance of optimal conditions throughout this step, are satisfactory results obtained. After this step, the protein formed in the splitting of the complex is separated off. The filtrate is then further worked up, and by salting out with sodium chloride and acidifying with hydrochloric acid, a precipitate produced which contains the total of the free inhibitor. This precipitate or intermediate product can be worked up to form the desired end product by subjecting the same to fractionation either by controlled contacting with hydrochloric acid in the presence of sodium chloride having a pH of 1.7 to 9.0, or by introducing the precipitate into a column filled with a suitable neutral material for instance kieselguhr and eluting with a sodium chloride solution in a dilute phosphoric acid whose pH is continuously increased from 3.0 to 9.0. In both cases, the fractions obtained in the pH range of 3.0 to 6.0 are collected and after deionization further worked up to the pure inhibitor material in the known manner for instance by freeze drying or precipitation with acetone. The recovered substance is thereafter worked up to form the therapeutic agents. The agents can be formulated for instance as sublingual tablets or injection solutions.

The pancreatic protease inhibitor obtained in accordance with the invention evidences in pharmacological application a highly specific activity. In testing a conventionally prepared series of inhibitors, the preparation of the invention is established to be a relatively active fibrinolysis inhibitor and this is true both in vitro and in vivo. In vitro, this effect was further evaluated by means of thromboelastographic determinations of rabbit plasma fibrinolysis following pre-activation with streptokinase and also in an artificial fibrinogen-thrombin-fibrinolysin system. In both test procedures, the preparation of the invention demonstrated the highest degree of activity as compared to the conventionally prepared inhibitors and produced no blood coagulation inhibiting activity as for instance does the soybean isolated inhibitor. In vivo, the estimation was carried out again under the use of the referred-to thromboelastic graph technique and with streptokinase pretreated rabbits. In further experiments in vivo, the time of the inhibitor activity was followed after administration of different intravenous or subcutaneous doses whereby equally high activities were demonstrated in each case for the substances of the invention.

The preparations of the invention demonstrate further valuable pharmacological properties. Their toxicity is low, therapeutic doses do not influence either the blood pressure or respiration of the experimental animal, the high degree of purity of this material, i.e., the same has the properties of a low molecular peptide which forcloses against a sensitization reaction.

The protease inhibitors produced by the process of the invention are suitable for use as therapeutic agents in different conditions which are characterized by a disturbed equilibrium of the fibrinolytic system as for instance found in gynecological practice, in different post-operative conditions, in pancreatic disease and the like. The agents can be administered orally in the form of sublingual tablets or parenterally, for instance intravenously, which latter form is preferred in acute conditions in which a rapid increase of the protease inhibitor level is desired.

Further details of the process of the invention can be seen from the following examples. The same describe only a single possibility of carrying out the process, and are accordingly not to be considered as exhaustive or limiting. In Example 1, the inhibitor is isolated through fractional precipitation while in Example 2, the successive dissolution technique is used. In both cases, an essentially pure product is obtained.

EXAMPLE 1

The squeezed-out hog or cattle minced moist pancreas material remaining after extraction of insulin, was further comminuted and then mixed with a two-fold volume (calculated on the amount by weight) of 66 percent aqueous ethanol to which an 0.5 to 20 percent sodium hydroxide solution had been added. The extraction was carried out under intensive stirring for 3 hours at room temperature. After this time had elapsed, the liquid fraction was separated off by centrifugation and the solid material treated a second time in the same manner as just described. The ethanolic extracts were combined, filtered and concentrated in a vacuum evaporator at 35° to 40° C. The concentrated extract was allowed to stand for 1 hour at room temperature whereby the lipoid material present was separated out. The lipoid material was separated off, washed with lukewarm water, and the wash water added to the concentrated extract. The extract was reacted slowly and under stirring with solid ammonium sulfate in an amount of 550 g/l extract. The precipitated material which formed was isolated after addition of kieselguhr either by suction filtration or centrifugation. Thereafter the precipitate was suspended in a five-fold volume of water (calculated on the weight of the precipitate), stirred and the pH adjusted to a value of 6.0 to 7.0 by means of a 20 percent sodium hydroxide solution. The suspension was thereafter heated to 50° C. and under strong stirring, reacted with trichloracetic acid in the form of a concentrationed solution to a final concentration of 2.5 percent. Under constant stirring, the suspension was heated to 70° C. and maintained constant at this temperature for 5 minutes. The suspension was then cooled down to 15° to 20° C., allowed to stand for 1 to 2 hours and the precipitate which formed separated by filtration. The clear filtrate was brought to a pH of 7.5 with a 20 percent sodium hydroxide solution and solid sodium chloride in an amount of 28 g/100 ml then added. The viscous turbid liquid which was formed was slowly reacted under stirring with 10 percent hydrochloric acid to a pH of 2.0. A voluminous precipitate separated out, which was separated off by suction filtering or centrifugation and in the moist state or after dewatering with an organic water miscible solvent such as acetone or ether worked up further.

The precipitate which contains the total free inhibitor was purified by dissolving in water having a pH of 7.5 to form a 5 percent solution, the solution reacted with solid sodium chloride in an amount of 25 g/100 ml whereby a weak turbidity set in. Under strong stirring, this mixture was reacted slowly in dropwise fashion with 10 percent hydrochloric acid, whereupon a precipitate formed. After a pH value of 6.0 was reached, the precipitate was centrifuged off (Fraction A), and further acid added to being the pH to 4.5. A further precipitate was formed which was also separated by centrifugation (Fraction B). Following further acidification to a pH of 3.0, a further precipitate was separated (Fraction C), and finally the pH brought to 1.5 whereby the total remaining peptide fraction (Fraction D) was separated. The Fractions A and D have only a weak inhibiting activity against trypsin. The most active fraction is Fraction B. An active portion of the inhibitor is contained in Fraction C. The fractions A and D were combined and were at a later time, purified through further fractionation procedures.

The active fractions B and C were combined, desalted following solution in water with the aid of ion exchangers and after the desalting of the solution, the inhibitor was isolated by freeze drying or through precipitation with acetone and dehydration of the precipitate with water miscible organic solvents. The activity of the recovered inhibitor preparation amounted to 2,000 to 5,000 KIU/l mg/international kallikrein units. The yield was 8 to 10 million KIU from 100 kg of the cut-up pancreatic starting material.

EXAMPLE 2

In the same manner as in Example 1, there were carried out the ethanol extraction, separation of lipoids, and separation of higher molecular protein fractions with trichloracetic acid. The further working up of the active precipitate, i.e., the fractionating of a sodium chloride containing solution thereof with hydrochloric acid was carried out through fractionating on a kieselguhr column whereby a highly active, pure and color-free substance was recovered.

Kieselguhr was stirred into a 0.01 M phosphoric acid solution which contained 22 to 25 percent sodium chloride and which had a pH of 1.7 and the resulting suspension poured into a column having a 35 mm diameter. There was formed a 210 mm high kieselguhr column. There was then introduced into the column a suspension formed by mixing 2g of active precipitate with one-third the amount of original kieselguhr containing suspension whereby the column was increased in height by about 70 mm. The column was washed through with 0.01 M phosphoric acid and the elution begun with the linear gradient i.e., with a 0.01 M phosphoric acid solution containing 22 to 25 percent sodium chloride (pH 1.7). The pH of such solution was continuously increased upwardly to a value of 9.0 by means of 10 percent soda lye. The flow velocity amounted to 2.5 to 5.0 ml/min. The fractions were collected in 25 ml aliquots. During the elution, the pH of the eluting agent was increased at constant concentration of sodium chloride. The initial fractions up to pH 3.0 were substantially inactive, the active peptide fraction flowed through next (controlled with Follin-reagent) up to a pH of 5.0–5.4. The following fractions were less active. The eluate containing the active fraction was worked up as in Example 1. The activity of the recovered product amounted to 2,000 to 5,000 KIU/1mg.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. Process for preparing in inhibitor for proteolytic enzymes selected from the group consisting of trypsin, chymotrypsin, thrombin, plasmin and kallikrein from the hog and cattle pancreas material remaining following extraction thereof with a dilute mineral acid for recovery of insulin therefrom which comprises the steps of (a) extracting such moist cut-up pancreatic material with 60 to 70 percent aqueous ethanol having a pH of 10–13, (b) removing the ethanol from the extract by evaporation under decreased pressure and at a temperature not exceeding 40° C., (c) cooling the remaining concentrated extract whereby lipoids present therein are separated out and removing the separated lipoids, (d) introducing a water-soluble inorganic salt selected from the group consisting of ammonium sulfate and magnesium sulfate whereby a precipitate comprising a protein complex is separated out and recovering the precipitate, (e) forming a suspension of the precipitate from step (d) in water having a pH of 5.5 to 7.5 and heating the suspension to a temperature of 50° to 80° C, introducing trichloracetic or sulfosalicylic acid into the suspension in a concentration of 2 to 3 weight percent, cooling the resulting mixture to a temperature of 15° to 20° C, whereby the protein is separated out as a precipitate and separating off said protein precipitate, (f) adjusting the pH of the filtrate to a pH of 7.0 to 7.5, saturating the filtrate with sodium chloride in an amount of 25 to 30 g/100 ml filtrate and acidifying the saturated filtrate with hydrochloric acid to provide a pH of 1.0 to 3.0 whereby the inhibitor is separated out as a precipitate, and (g) subjecting the precipitate from step (f) to successive washings with a buffered sodium chloride solution whose pH is successively increased from 1.7 to 9.0 and separately recovering the fractions from each washing, combining the fractions recovered in the pH range of 3.0 to 6.0, subjecting the combined fractions to deionization and recovering the pure inhibitor from the deionized solution by precipitation with acetone or by freeze drying.

2. The process of claim 1 wherein the pH of the aqueous ethanol used in step (a) is adjusted to 10.0 to 13.0 by addition of an alkaline agent selected from the group consisting of sodium-, potassium- and ammonium hydroxide.

3. The process of claim 1 wherein said buffered sodium chloride solution used in step g) is a 22 to 25 percent sodium chloride solution in 0.01 M phosphoric acid whose pH is increased by addition of sodium hydroxide thereto.

* * * * *